Nov. 27, 1923.  1,475,519
C. B. SNIDER
TIRE REMOVING TOOL
Filed Feb. 15, 1923
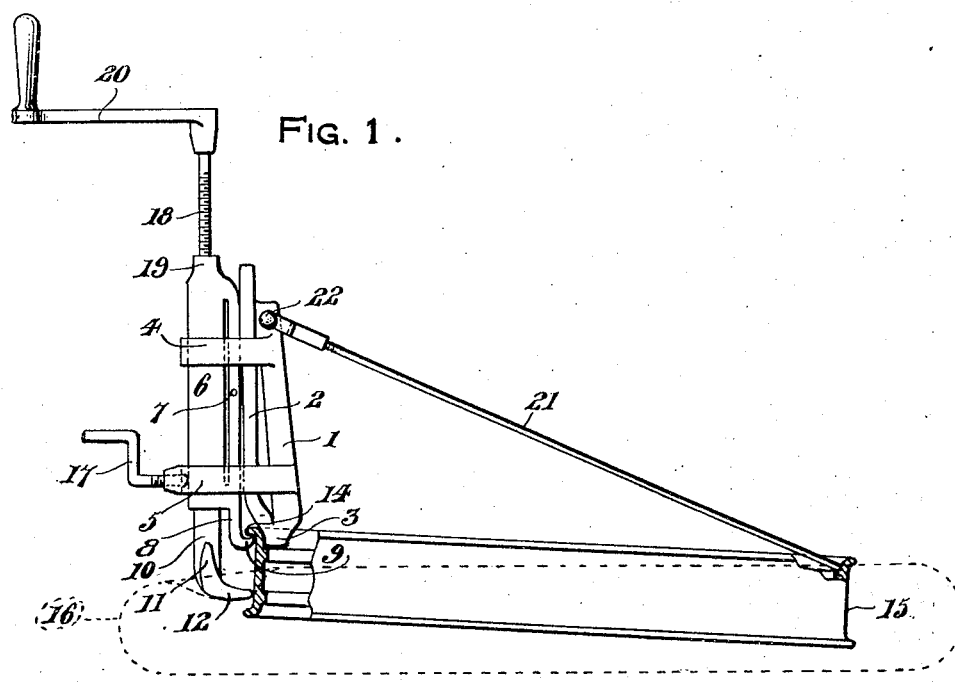
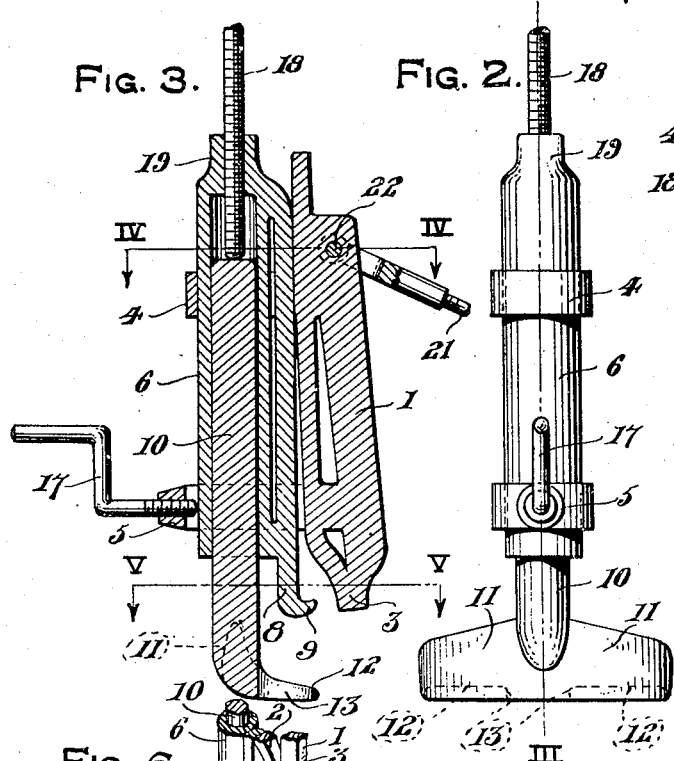
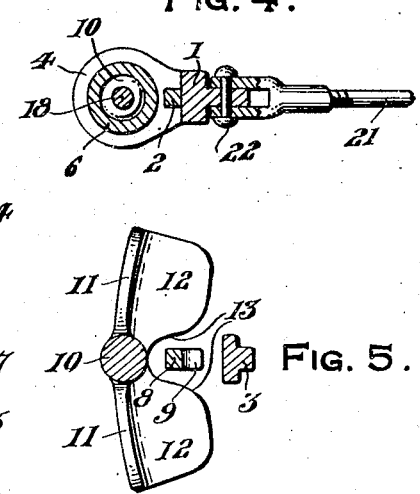
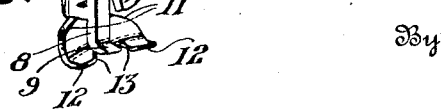

Patented Nov. 27, 1923.

1,475,519

UNITED STATES PATENT OFFICE.

CLINT B. SNIDER, OF INDEPENDENCE, KANSAS.

TIRE-REMOVING TOOL.

Application filed February 15, 1923. Serial No. 619,240.

*To all whom it may concern:*

Be it known that I, CLINT B. SNIDER, a citizen of the United States of America, residing at Independence, in the county of Montgomery and State of Kansas, have invented certain new and useful Improvements in Tire-Removing Tools, of which the following is a specification.

This invention relates to certain new and useful improvements in tire removing tools and has particular reference to that type of tool for removing a pneumatic tire from a wheel rim.

The primary object of the invention is to provide a tire removing tool wherein a pair of gripping jaws or clamp members are moved into binding engagement with one side flange of a wheel rim, while a tire engaging member slidably carried by the tool is adapted to shift the tire laterally of the rim or remove the same, the tool being particularly effective in removing tires that have been rusted or otherwise improperly held upon a wheel rim.

The invention provides further improvements in the art, especially over the tire removing tools described in application filed by C. B. Snider on November 14, 1922, Serial No. 600,919 and a second application filed on January 18, 1923, Serial No. 613,465.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a tire removing tool constructed in accordance with the present invention, the same being shown as operatively mounted upon a wheel rim that is partly broken away and shown in section and having a pneumatic tire illustrated by dotted lines mounted thereon, Figure 2 is an edge elevational view of the tool showing the tire engaging member and foot carried thereby, Figure 3 is a vertical sectional view taken on line III—III of Fig. 2 showing the apertured or split foot at the outer end of the tire engaging member, the manually operable screw for shifting the same and the clamping member for engaging a wheel rim flange, Figure 4 is a detail sectional view taken on line IV—IV of Fig 3 showing the pivotal connection of the brace rod carried by the removing tool, Figure 5 is a detail sectional view taken on line V—V of Fig. 3 showing the relation between the tire engaging and clamping member, and Figure 6 is a fragmentary perspective view of the lower end of the tool showing one of the clamping members normally positioned between the end flanges of the tire engaging foot.

Referring more in detail to the accompanying drawing, there is illustrated a tire removing tool embodying a frame member having a bar 1, and a rod 2 integrally formed therewith as shown in Figs. 1 and 3, the rod 2 being spaced from the bar 1 for a portion of its length and formed integral therewith at its lower end to form a clamping jaw 3. A pair of laterally extending spaced straps 4 and 5 are carried by the upper and lower ends of the bar 1.

An elongated casing 6 is slidably mounted within the straps 4 and 5, movement thereof in opposite directions being limited by the pin 7 projecting laterally of the casing 6 and adapted for engagement with the straps 4 and 5 as will at once be evident from an inspection of Fig. 1, the pin 7 preventing accidental displacement of the casing from the supporting frame. The lower end of the casing 6 is open as shown in Fig. 3 and carries a depending foot 8 provided with a hook or clamp 9 upon the lower end thereof adapted for cooperation with the clamp 3 in a manner to be presently described.

A rod 10 is slidably mounted in the bore of the casing 6 and constantly projects from the lower open end thereof, the lower end of the rod 10 carrying an arcuate cross foot 11 provided with spaced end extensions 12 forming a central space or opening 13.

In positioning the tool upon a wheel rim and tire as shown in Fig. 1, the rod 10 is shifted to its limit of movement within the casing 6 positioning the hook or clamp 9 within the opening 13 in the foot at the lower end of the rod as shown in Fig. 6. When so positioned, the clamp member 3 formed at the lower end of the bar 1 and rod 2 is positioned at the inner side of the flange 14 of the wheel rim 15 with the extensions 12 of the tire engaging foot 11 and clamp 9 upon the lower end of the casing 6 engaging the adjacent side and bead of a tire 16. The adjusting screw 17 is then operated through the outer end of the strap 5 for shifting the casing 6 and rod 10 in a direction toward the bar 1 to cause the clamp members 3 and 9 to grip the flange 14 of the wheel rim as shown in Fig. 1. The screw 18 threaded through the upper closed end 19 of the casing 6 engages the upper end of the rod 10 as shown in Fig. 3 for shifting the rod outwardly of the casing to cause the foot carried by the lower end thereof and engaging the tire to remove the tire from the wheel rim, the screw 18 being operated by the crank handle 20. To correctly position the tire removing tool upon the rim 15, a rod 21 is pivotally connected as at 22 to the upper end of the bar 1, with the free end thereof engaging the opposite side of the wheel rim as shown in Fig. 1. It will therefore be seen from an inspection of Fig. 1, that the upper side of the wheel rim 15 is gripped between the clamping members 3 and 9 and when the rod 10 is longitudinally shifted exteriorly of the casing 6, the lower end thereof engages the tire 16 for forcing the same from the wheel rim 15 for purposes of removing the tire.

While there is herein shown and described the preferred embodiment of the present invention, it is nevertheless to be understood that minor changes may be made therein without departing from the spirit and scope of the invention as claimed.

What is claimed as new is:—

1. In a tire removing tool, a frame including a bar having a clamping jaw at the lower end thereof, a casing slidably associated with the bar and having a clamping jaw at the lower end cooperating with the aforesaid clamping jaw, means for moving the jaws into clamping engagement with the side flange of a wheel rim, a rod slidable in the casing and projecting from the lower end thereof, a tire engaging foot carried by the outer end of the rod, manually operable means for moving the rod outwardly of the casing, said foot having laterally directed end flanges forming an intervening space with the clamping jaw on the casing normally positioned in the space during mounting of the tool on a rim and tire, and a brace rod having one end pivoted to the tool with the free end adapted for engaging the wheel rim.

2. In a tire removing tool, a frame including a bar having a clamping jaw at the lower end thereof, spaced laterally projecting guide straps carried by said frame, a casing having a clamping jaw at its lower end longitudinally and laterally movable in respect to said bar within said straps, means for limiting the longitudinal movement of said casing, means for moving said casing laterally for causing the aforesaid clamping jaws to cooperate for engaging the side flange of a wheel rim, a rod slidable in the casing and projecting from the lower end thereof, a tire engaging foot carried by the outer end of the rod, and means for moving said rod outwardly of said casing for removing said tire from said rim.

In testimony whereof I affix my signature.

CLINT B. SNIDER.